United States Patent [19]

Hankins et al.

[11] 3,992,569

[45] Nov. 16, 1976

[54] PROTECTIVE CABLE ENCLOSURE, CABLE ASSEMBLY INCLUDING THE SAME, AND METHOD OF ENCAPSULATING A CABLE IN A PROTECTIVE ENCLOSURE

[75] Inventors: Norman K. Hankins, Northridge; Richard L. DeMonsy, Encino, both of Calif.

[73] Assignee: Hexcel Corporation, Dublin, Calif.

[22] Filed: Feb. 11, 1975

[21] Appl. No.: 548,955

[52] U.S. Cl. ............................. 174/92; 29/628; 156/49; 174/21 R; 174/71 R; 174/76; 264/272
[51] Int. Cl.² ................... H02G 15/08; H02G 1/14
[58] Field of Search .......................... 174/91–93, 174/76, 77 R, 138 F, 21 R, 71 R, 72 R, 88 R; 264/272, 275; 29/628; 156/48, 49

[56] References Cited
UNITED STATES PATENTS

| | | | |
|---|---|---|---|
| 2,867,680 | 1/1959 | Stecher | 174/92 |
| 3,148,241 | 9/1964 | Moore | 174/92 |
| 3,576,937 | 5/1971 | Eldridge, Jr. | 174/92 |
| 3,715,459 | 2/1973 | Hoffman | 174/92 X |
| 3,836,694 | 9/1974 | Kappell | 174/92 |

FOREIGN PATENTS OR APPLICATIONS 1,813,201   7/1970   Germany ............................. 174/92

*Primary Examiner*—Laramie E. Askin
*Attorney, Agent, or Firm*—Townsend and Townsend

[57] ABSTRACT

A versatile protective closure for a cable splice comprising complementary mating body portions having a generally cylindrical shape terminating in serrated tapered ends, each portion including a pair of longitudinally extending flange portions each having an inner and an outer raised rim portion. The rim portions have alternate tongues and grooves arranged to define separate central and outer enclosed chambers when the two body portions are mated to form a casing about a cable. The top body portion has inner and outer filling apertures at each end in communication with the central and outer enclosed chambers, and a pair of optional annular partitioning members can be received internally in a region between adjacent inner and outer filling apertures to provide fluid isolation between the central and outer chambers. A plurality of axially spaced, circumferentially extending stiffener ribs are grooved to receive optional closure bands.

The device provides both re-enterable and permanent enclosures for cables, as desired. In use, the cable is installed longitudinally of the bottom body portion, the top body portion is fitted and suitable encapsulant material is poured into the central and outer chamber filling apertures. The partitioning members are installed prior to mating the body portions when isolation of the central and outer chambers is required. For permanent enclosures, a hard setting encapsulant is poured throughout both chambers. For re-enterable enclosures, a soft setting encapsulant is poured throughout both chambers, or the partitioning members are installed and the central and outer chambers are filled with soft and hard setting encapsulant, respectively. The central chamber may also be filled with grease melted and poured or injected under pressure or a dry gas at ambient or under pressure.

The enclosure may be re-entered by parting the two body portions along mating surfaces of the peripheral flanges.

18 Claims, 6 Drawing Figures

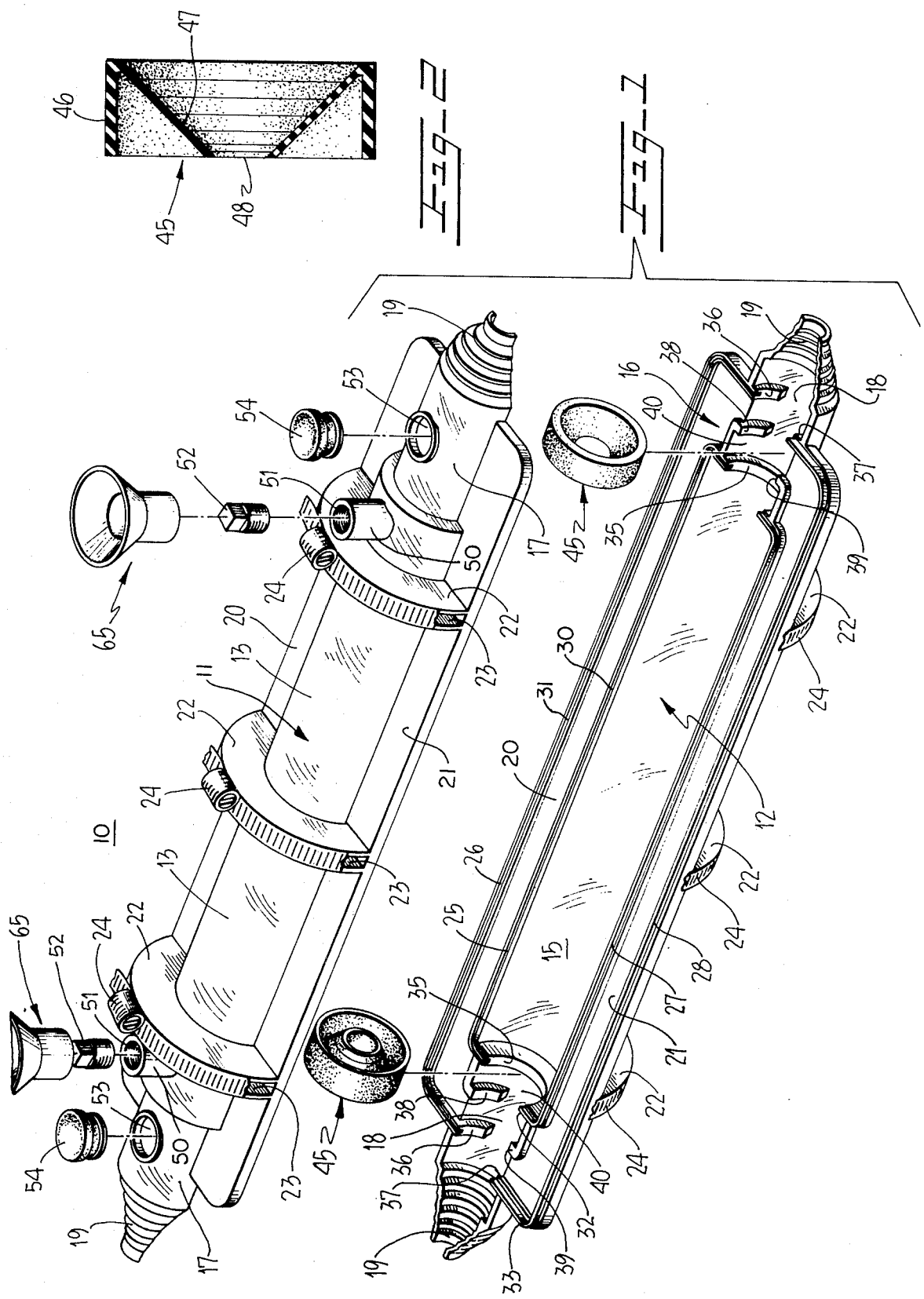

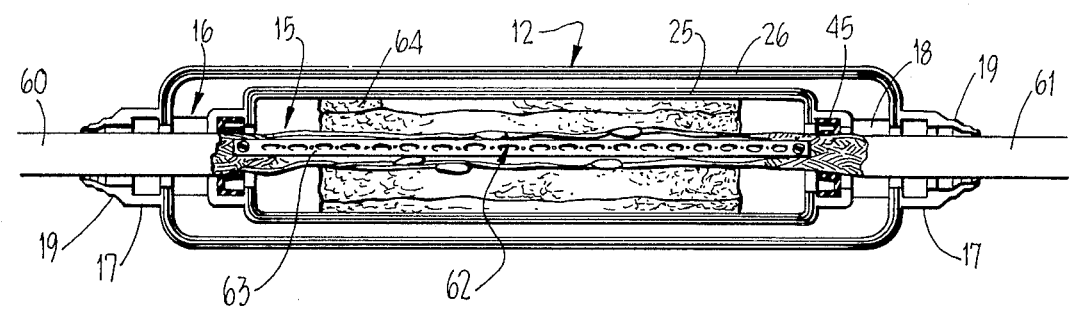
Fig_3
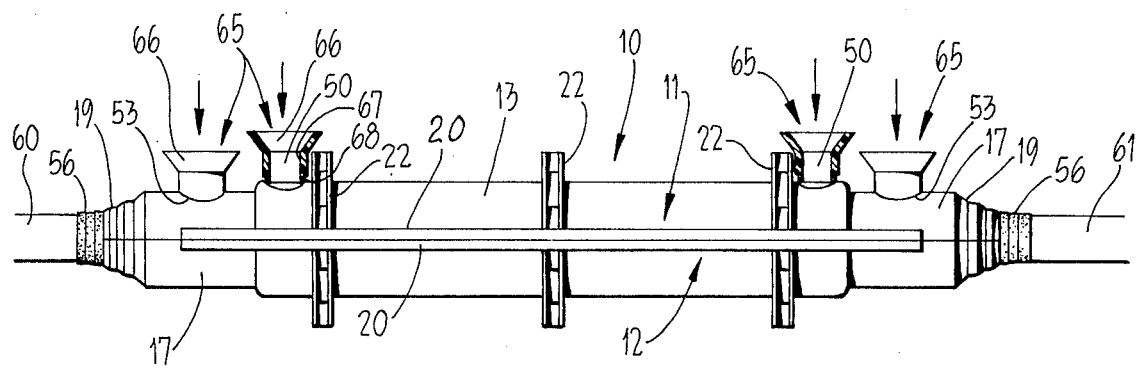
Fig_4
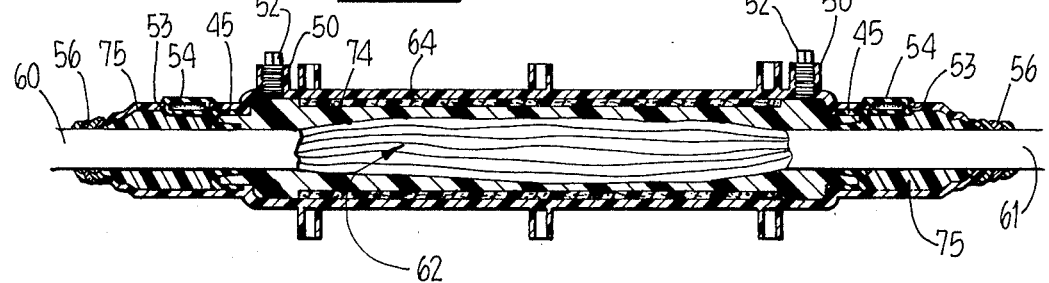
Fig_5
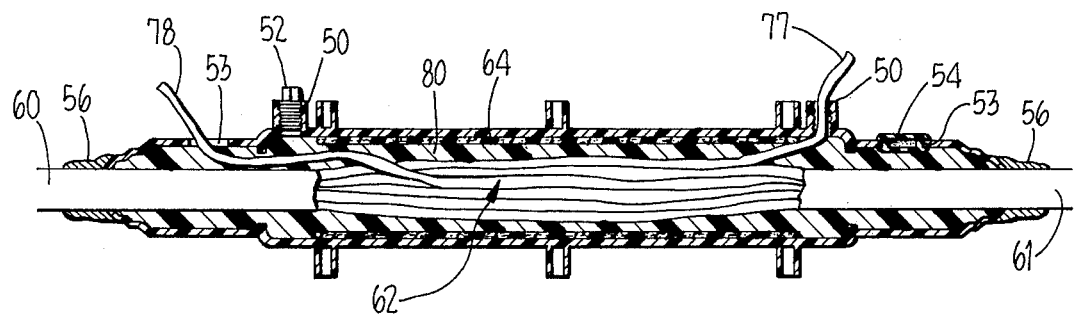
Fig_6

PROTECTIVE CABLE ENCLOSURE, CABLE ASSEMBLY INCLUDING THE SAME, AND METHOD OF ENCAPSULATING A CABLE IN A PROTECTIVE ENCLOSURE

BACKGROUND OF THE INVENTION

This invention relates to devices and techniques for encapsulating cables. More particularly, this invention relates to devices and techniques for providing rigid encapsulation for cables.

In many cable applications, it is necessary to splice into the central metallic conductor strands in order to rearrange the connections, to provide a local connection, or to isolate a predetermined cable length for testing purposes. In telephone cables, for example, it is frequently necessary to splice into one or more of the pairs of multiple conductors contained within the cable for repair purposes. Splices are also required when the distance between the two points to be spanned is greater than the length of the longest available cable.

In splicing cables it is necessary to expose the metallic conductors covered by the sheath to provide the desired connections. In order to protect the exposed conductors against deterioration caused by moisture, gasses, or other contaminants, and to protect against electrical short circuiting, it is necessary to reseal the individual conductors with electrically insulative material, such as electrician's tape, insulative sleeves and the like. In severely hostile environments, or in applications where the cable will be permitted to remain undisturbed for long periods of time, these insulators are known to break down and deteriorates with the resulting failure of the cable. It is thus necessary to provide a protective enclosure to prevent this occurrence.

In some applications, it is also desirable to provide a specific environment for a pair of spliced cable ends. The environment may be gaseous, e.g. helium or air, liquid, e.g. oil or grease, or solid, e.g. hard or soft, curing compounds.

In still other applications, it may be necessary to re-enter the cable after aplicing in order to alter the electrical connections by adding or removing branch-out conductors or by rearranging the electrical connections within the cable itself.

Many devices and methods are known for providing enclosures for cables subjected to a hostile environment, e.g. excess moisture, pressure from the surrounding soil in subterranean cables and the like. Both rigid and flexible enclosures have been provided in the past for this purpose. Examples of the former are found in U.S. Pat. Nos. 3,836,694, 3,255,302 and 3,183,302; examples of the latter are U.S. Pat. Nos. 3,495,026, 3,836,702 and 3,781,461. Such protective enclosures share in common the purpose of providing a controlled enclosed environment for a small section of a cable and are typically employed to protect exposed connections, one or more temporary or permanent cables splices and similar interruptions to the continuity of the customarily provided protective cable sheath.

The varying requirements stated supra and other requirements in the past have been met by protective enclosures tailored to the particular requirements of a given application. Thus, at present many different types of protetive enclosures have been developed to meet specific needs. Efforts to date, however, to provide a single protective enclosure capable of meeting the frequently conflicting requirements of a wide variety of applications have not met with success.

SUMMARY OF THE INVENTION

The invention comprises a method and apparatus for prviding a protective enclosure for a cable which has application to a wide variety of conflicting enclosure requirements, which is relatively inexpensive to manufacture, and which requires a minimum of technical skill to install.

In the preferred embodiment of the apparatus, a pair of complementary substantially rigid half body portions which mate together to form a protective enclosure for a cable splice or the like are provided with a compound inner wall surface forming a central chamber, a pair of end chambers at opposite ends of the half body portions and a pair of intermediate retaining portions each intermediate a different one of the end portions and the central chamber for receiving an auxiliary partitioning member for isolating the central chamber from the end chambers.

The partitioning member comprises a pliable generally annular member having an outer wall and an integrally formed inwardly tapering apertured inner wall.

The ends of each half body portion are provided with tapered serrated ends adapted to be trimmed away to accommodate cables of varying outer diameters. Each half body portion is provided with a pair of oppositely disposed longitudinally extending flanges, with each flange having an inner and an outer raised rim portion, each rim portion alternately having a tongue or aa recessed groove engaging a mating rim portion so that the inner pairs of rim portions extend generally peripherally of the central chamber and the outer pairs of rim portions extend along the outer edges of the peripheral flanges to define therebetween an outer chamber which includes the body portion end chambers.

Each half body portion is also provided with a plurality of circumferentially disposed axially spaced rib portions for receiving band-like closure clamps.

The top half body portion is provided with an inner and outer pair of filling apertures, the former communicating with the central chamber and the latter communicating with the opposite end chambers. The inner filler apertures are each provided with an internally threaded projection extending axially away from the outer surface of the half body portion for receiving an externally threaded closure plug, and each has an outer diameter sized to accommodate the inner diameter of the neck portion of a filler funnel. Each funnel preferably includes a circumferentially extending recess adjacent the free end of the neck portion thereof having an outer diameter sized to be received in each of the outer apertures which provides a rest for the funnel.

A resilient closure plug is also provided for sealing the outer aperture pairs prior to installation.

In use, the tapering ends of the half body portions are first trimmed until the inner diameter of each end is substantially equal to the outer diameter of the cable to be enclosed. In applications requiring the use of the partitioning members, these members are first cut so that the aperture in the tapering inner wall has a diameter slightly less than the outer diameter of the cable, and the partitions are then installed in their respective retaining portions of the lower half body portion of the enclosure to be formed. The spliced cable is then arranged centrally of the bottom half body portion, the top half body portion is mated to the lower half portion and the ends of the enclosure are sealed with plastic tape. Clamps are then optionally placed around the rib portions, and the filler funnels are installed in the openings in the top half body portion of the housing. The encapsulant materials are then poured or injected into the respective chambers until full, after which the funnels are removed, the closure caps and threaded plugs are installed and the now-completed enclosure is installed in situ. Where immediate or rapid installation is required, the assembly may be installed immediabely after pouring without waiting for the materials to harden.

In those applications not requiring separate encapsulant or environmental substances in the central and outer chambers, the partition members are omitted, and a single type of encapsulant material is poured or injected into the interior of the apparatus.

Depending on the type of installation required, the entire volume within the enclosure may be filled with a hard setting encapsulant material to produce a non re-enterable enclosure, or with a soft curing encapsulant material to produce a re-enterable enclosure. Also, re-enterable enclosures may be produced with the use of the partition members by pouring hard curing encapsulant material into the outter chamber and soft curing encapsulating material, grease, or other fluids in the inner chamber.

The re-enterable embodiments may be opened by simply parting the two half body portions comprising the enclosure. This may be done by inserting a chisel, screwdriver or other suitable tool between the mating surfaces of the peripheral flanges to force the two half portions apart.

For a fuller understanding of the nature and advantages of the invention, reference should be had to the ensuing detailed description taken in conjunction with the accompanying drawings.

BRIEF DESCRIPTION OF THE DRAWINGS

FIG. 1 is an exploded perspective view of the preferred embodiment of the invention;

FIG. 2 is a sectional view showing a partition member;

FIGS. 3-5 are sequential views illustrating formation of a first type of enclosure; and FIG. 6 is a sectional view showing an alternate type of enclosure.

DESCRIPTION OF THE PREFERRED EMBODIMENT

With reference to the drawings, FIG. 1 shows an exploded perspective view of the preferred embodiment of the invention. As seen in this figure, an enclosure generally designated by reference numeral 10 comprises two half body portions, viz. an upper half body portion 11 and a lower half body portion 12, each constructed from a moldable high hardness plastic material such as rigid vinyl, butyrate, polycarbonate or the like. Both half portions 11, 12 have a complementary configuration and each includes a generally semi-cylindrical central body portion 13 serving to define a central chamber 15 and a pair of opposed semi-cylindrical end portions 17 defining a pair of end chambers 18, with each end portion terminating in a tapered end half portion 19 having a serrated wall. Extending along the longitudinal axis of half body portions 11, 12 is a pair of peripheral flange portions 20, 21 integrally molded with the side of semi-cylindrical portions 13, 17 and teminating slightly inwardly of tapered end portions 19 and forming an extension thereof. Extending circumferentially of central semi-cylindrical portions 13 are a plurality of axially spaced raised stiffener ribs 22 having a central groove 23 for receiving an adjustable hose clamp 24 or other equivalent band-like closure clamp known to those skilled in the art.

The mating surfaces of peripheral flanges 20, 21 are each provided with inner and outer raised rim portions 25, 26 and 27, 28, respectively. Rim portions 25, 26 are each provided with a central recessed groove 30, 31, while rim portions 27, 28 are each provided with raised tongue portions 32, 33. In addition, inner rim portions 25, 27 are joined by an arcuate rib 35 at each end while outer rim portions 26, 28 each terminate in arcuate segments 36, 37 respectively. Intermedaite segment 35 and arcuate segments 36, 37 are a pair of arcuate segments 38, 39.

The inner region 40 defined between segments 35 and arcuate segments 38, 39, comprises a retaining portion for receiving an optional partitioning member 45 having the cross-sectional structure shown in FIG 2.

With reference to FIG. 2, each partitioning member 45 has an annular outer wall 46 and an inner wall 47 which tapers inwardly to form a generally conical wall structure with a central aperture 48. Partitioning member 45 is preferably fabricated from flexible vinyl or neoprene.

As will now be evident, with partitioning members 45 received in retaining portions, a pair of chambers are defined by the internal structure of the invention when body portions 11, 12 are mated together: viz. inner chamber 15 and outer chamber 16 comprising the volume enclosed by mating rim portions 25–28 and end members 18.

Extending radially outwardly of semi-cylindrical portions 13 of upper half body portion 11 are a pair of filler spouts 50 each of which is internally threaded at 51 to receive an externally threaded closure plug 52 shown in FIG. 5. Similarly, a pair of filler apertures 53 are formed in end portions 17 which are adapted to be sealed by a flexible closure plug 54 shown in FIG. 5.

The preferred embodiment may be used to provide a double volume cable enclosure in the following manner. Initially, the outer diameter of a cable to be encloses is measured and end portions 19 are trimmed back to a size having an inner diameter of a sufficient magnitude to snugly accommodate the cable. Partition members 45 are next slit radially and a central portion of inner wall 47 is removed, if necessary, to provide an aperture 48 having a diameter slightly less than the outer diameter of the cable, and the thus-prepared partitioning members 45 are placed into receiving portion 40 in bottom half body portion 12.

With reference to FIG. 3, which is a top plan view of bottom half body portion 12 of the casing 10 with a spliced cable installed, a pair of cable ends 60, 61 are received centrally of bottom half body portion 12 with a splice 62, which includes the usual outer shield strip 63, received in central chamber 15. As illustrated, a form spacer sheet 64 is placed in central chamber 15 to provide a resilient support for the cable splice 62. If desired, support 64 may be omitted depending on the requirements of a particular application. As is evident from FIG. 3, cable ends 60, 61 are snugly received in apertures 48 of partitioning members 45 so that the two half body portions, when mated as shown in FIG. 4, define inner chamber 15 and outer chamber 16.

With reference to FIG. 4, half body portions 11, 12 are next mated together, a layer of tape 56 is applied over end portions 19 and adjacent portions of cables 60, 61, and funnels 65 are installed on filler spouts 50 and in filling apertures 53. Preferably, funnels 65 are substantially identical and each comprises an inwardly tapering mouth 66 and a neck portion 67 having a recessed outer wall portion 68 adjacent the free end of the neck 67. Preferably, filler spouts 50 and filling apertures 53 are sized so that a funnel 65 may be snugly received about the outer diameter of filler spout 50 and so that recessed wall portion 68 may be received within the outer diameter of filler aperture 53 in order to permit use of a single type of funnel 65.

With the funnels installed as shown in FIG. 4, separate encapsulant materials are poured or injected into the interior of casing 10: a hard setting encapsulant material via filling apertures 53, and a soft setting encapsulant material via filler spouts 50, as required by a given application. The soft setting encapsulant material flows into central chamber 15; the hard setting encapsulant material flows into outer chamber 16. Preferably, during pouring, casing 10 is tipped slightly along the longitudinal axis so that one end is slightly higher than the other and the respective compounds are poured into the lower end filler openings, after which the direction of tilt is reversed and the filling is completed by pouring the respective compounds into the filler openings at the other end.

Once both chambers 15 and 16 are filled, the filler spouts 50 are sealed by installing externally threaded closure plugs 52 (FIG. 5), while the filling apertures 53 are sealed by means of press-in closure plugs 54.

FIG. 5 is a schematic sectional view showing the complete enclosure prior to installation. As shown in this figure, inner chamber 15 contains a first encapsulting compound 74 while outer chamber 16 contains a second encapsulating compound 75, the two encapsulating materials being separated by partition members 45 and portions of the cable ends 60, 61. The completed assembly may be installed in situ either immediately after pouring is completed or, if desired, after the encapsulant materials have hardened.

FIG. 6 is a sectional view of a completed enclosure requiring only a single type of encapsulating compound. As shown in this figure, a single encapsulating compound 80 extends throughout the interior of casing 10 and surrounds cable ends 60, 61 and central splice 62. The FIG. 6 embodiment is fabricated in a similar manner to that discussed above, with the exception that partition members 45 are omitted prior to fitting half body portions 11, 12, together and only a single type of encapsulant compound is poured or injected into the outer filling apertures 53. As further illustrated in FIG. 6, smaller cables 77, 78 may be spliced into the central conductors of splice 62 to form a branch splice, and routed externally of the enclosure via filler spouts 50 or filling apertures 53.

As will now be evident, the invention may be used in a plurality of modes, depending on the requirements of a particular application. For example, where a permanent, non re-enterable enclosure is required, partitioning members 45 may be omitted and a single, hard setting encapsulant material may be used, such as high hardness polyurethane elastomers, epoxy resins, or other similar hard setting plastic or resinous materials which provide a positive moisture barrier, an air pressure barrier and mechanical support for the entire structure. The invention may also be used to provide a re-enterable enclosure by employing a soft encapsulant, such as gel-like polyurethane elastomers, polypropylene, epoxy resins, butyl and silicone rubbers and other similar soft setting resinous materials, powders which are hydrophobic, frangible foams such as polyurethane foam, or grease-like compounds such as petrolatum, polyethylene, or the like. A re-enterable enclosure of the type shown in FIG. 5 can also be provided by installing partitioning members 45 and using a hard setting encapsulant of the type described above to fill outer chamber 16 and a soft setting encapsulant to fill inner chamber 15. Similarly, since the use of a hard encapsulant material in outer chamber 16 provides both a positive moisture barrier and an air pressure barrier between inner chamber 15 and ambient, inner chamber 15 may be filled with a gas either under pressure or at ambient. In addition, in some applications mechanical protection alone may be required for the enclosed cable. In such application, closure clamps may be installed about reinforcing ribs 22 and no encapsulant need be provided in the interior of the enclosure.

As will now be apparent, the invention provides a protective enclosure for a cable splice or the like which is inexpensive to fabricate, highly flexible in use and which requires a minimum of technical skill to install. Cable splice enclosures constructed in accordance with the teachings of the invention provide a high integrity outer shell which is easily re-enterable by simply separating the two half portions along peripheral flanges 20, 21 using a chisel, a srewdriver or the like.

While the above provides a full and complete disclosure of the preferred embodiment of the invention, various modifications, alternate constructions and equivalents may be employed without departing from the true spirit and scope of the invention. For example, although the preferred embodiment has been described as having cylindrical geometry, other geometrical configurations, such as ellipsoidal, oblate spheroidal or asymmetrical may be employed as desired. Therefore, the above description and illustrations should not be construed as limiting the scope of the invention, which is defined by the appended claims.

What is claimed is:

1. An apparatus for providing a protective enclosure for a cable, said apparatus comprising:
   first and second complementary housing members adapted to be fitted to each other and defining a cable splice encapsulating housing when secured to each other, each housing member having a central body portion with an inner surface defining a central cavity forming a central chamber when the members are secured to each other, each member further including opposing end portions each with an inner surface defining an end cavity, and a pair of laterally protruding, longitudinally extending flange portions terminating addjacent said end portions, said flange portions having inner and outer rim portions defining a longitudinal cavity therebetween in communication with said end cavities, the end cavities and the longitudinal cavities defining an outer chamber when the members are secured to each other, the outer chamber being comprised of end chambers in communication with longitudinal chambers, said rim portions closing the longitudinal chambers from the exterior of the housing and separating the longitudinal chambers from the central chamber, means establishing fluid communication between said central chamber and said end chambers when the members are secured to each other, and means adapted to admit an encapsulant material to said central chamber and to said outer chamber when the members are secured to each other.

2. The apparatus of claim 1 including partitioning means adapted to coact with a portion of said cable and the means establishing fluid communication for selectively interrupting said fluid communication between said central chamber and said end chambers, said partitioning means comprising a pair of flexible members each having an annular outer wall and a tapered inner wall integrally formed with said outer wall.

3. The apparatus of claim 1 wherein said inner and outer rim portions of both said housing members are alternately provided with centrally arranged tongues and grooves, the tongues and grooves of the inner and outer rim portions of one of said housing members being arranged to mate with corresponding grooves and tongues, respectively, of the opposite housing member.

4. The apparatus of claim 1 wherein said admitting means includes first means adapted to admit a first encapsulant material to said central chamber and second means adapted to admit a second encapsulant material to said outer chamber.

5. The apparatus of claim 4 wherein said first and second admitting means are both provided in one of said complementary housing members.

6. The apparatus of claim 1 wherein said housing members are fabricated from a light weight moldable plastic material.

7. A method of encapsulating a cable in a protective enclosure having a pair of complementary housing members each with a central cavity, opposing end cavities and a pair of longitudinally extending flange portions each having inner and outer rim portions for defining a flange cavity in communication with said end cavities, intermediate means for providing fluid communication between the central cavity and the end cavities, said complementary central cavities forming a central chamber and said end cavities and said flange cavities forming a continuous outer chamber longitudinally encircling the central chamber and closed to the exterior when said complementary housing members are mated, and means adapted to admit an encapsulant material to said central chamber and said end chamber, said method comprising the steps of:
a. arranging said cable in a first one of said housing members with the axis of said cable generally parallel to the axis of said housing member;
b. fitting the remaining one of said housing members to said first housing member to form said central and said outer chambers;
c. securing the fitted housing members to each other; and
d. thereafter pouring encapsulant compound into said chambers.

8. The method of claim 7 wherein said step (a) is preceded by the step (i) of arranging a partitioning member in the region of said intermediate means to obstruct fluid communication between said central and said outer chambers.

9. The method of claim 8 wherein said step (d) of pouring includes the steps of (ii) pouring a first encapsulant material into said central chamber, and (iii) pouring a second encapsulant material into said outer chamber.

10. The method of claim 7 wherein said step (d) of pouring is followed by the step of (e) of sealing said means adapted to admit an encapsulant material.

11. The method of claim 7 wherein said step (d) of pouring includes the steps of:
v. raising one of said end portions relative to the other;
vi. pouring said compound into the other end of said central and said outer chambers;
vii. raising the other end portion relative to said one end portion; and
viii. pouring said compound into said one end of said central and said outer chambers.

12. An enclosed cable assembly comprising:
a cable; and
a protective enclosure surrounding said cable, said protective enclosure comprising first and second complementarily configured housing portions constructed of a lightweight, moldable plastic material, the housing portions being secured to each other and having inner wall surfaces defining a central chamber, a pair of opposed end chambers, and a pair of intermediate chambers between said end chambers and said central chamber, each of said housing portions further including a pair of laterally protruding, longitudinally extending flange portions having inner and outer rim portions proximate to and relatively remote from the central chamber, respectively, to define a pair of flange chambers opening into said end chambers, said end chambers and said flange chambers comprising an outer chamber closed to the exterior, and encapsulant material located in said central chamber and said outer chambers disposed about the portion of said cable interior to said protective enclosure.

13. The enclosed cable assembly of claim 12 wherein one of said housing portions is provided with a plurality of filling apertures opening into said central and said outer chambers.

14. The enclosed cable assembly of claim 13 wherein a first pair of said filling apertures are located in opposite ends of said central chamber and a second pair of said filling apertures are located each at a different one of said opposed end chambers.

15. The enclosed cable assembly of claim 13 further including closure means coupled to said filling apertures.

16. The enclosed cable assembly of claim 12 including a pair of partitioning members each positioned in a different one of said pair of intermediate chambers for substantially isolating said central chamber from said outer chamber said partitioning members each including an annular outer wall and an integrally formed tapered inner wall terminating in a central aperture in which an adjacent portion of said cable is received.

17. The enclosed cable assembly of claim 16 wherein said outer chamber contains a hard setting insulative compound and said inner chamber contains an encapsulant material selected from the group consisting of soft setting insulative compounds, frangible foam, powder, grease and a gas.

18. The enclosed cable assembly of claim 12 wherein said rim portions of said flange portions are alternately provided with centrally arranged tongues and grooves, the tongues and grooves of the inner and outer rim portions of one of said housing members being enaged with corresponding grooves and tongues, respectively, of the opposite housing member.

* * * * *